United States Patent
Ogino et al.

(10) Patent No.: US 12,087,015 B2
(45) Date of Patent: Sep. 10, 2024

(54) PHOTOGRAPHING SYSTEM, CALIBRATION METHOD, AND NON-TRANSITORY COMPUTER-READABLE MEDIUM STORING PROGRAM

(71) Applicant: NEC Corporation, Tokyo (JP)

(72) Inventors: Yuka Ogino, Tokyo (JP); Masato Tsukada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 105 days.

(21) Appl. No.: 18/008,769

(22) PCT Filed: Jun. 9, 2020

(86) PCT No.: PCT/JP2020/022714
§ 371 (c)(1),
(2) Date: Dec. 7, 2022

(87) PCT Pub. No.: WO2021/250785
PCT Pub. Date: Dec. 16, 2021

(65) Prior Publication Data
US 2023/0252680 A1    Aug. 10, 2023

(51) Int. Cl.
*G06T 7/80*      (2017.01)
*G02B 3/12*      (2006.01)
(Continued)

(52) U.S. Cl.
CPC .............. *G06T 7/80* (2017.01); *G02B 7/36* (2013.01); *H04N 23/67* (2023.01)

(58) Field of Classification Search
CPC ... G02B 3/12; G02B 7/36; G02B 7/04; H04N 23/67; H04N 23/673; H04N 23/676
See application file for complete search history.

(56) References Cited

U.S. PATENT DOCUMENTS 10,915,000 B2 * 2/2021 Sakai .................. G02F 1/29
11,215,739 B2 * 1/2022 Igasaki .................. G02F 3/14
(Continued)

FOREIGN PATENT DOCUMENTS

JP      2019-203928 A1   11/2019
WO     2011/052770 A1    5/2011

OTHER PUBLICATIONS

International Search Report for PCT Application No. PCT/JP2020/022714, mailed on Aug. 04, 2020.

*Primary Examiner* — Marly S Camargo
(74) *Attorney, Agent, or Firm* — Sughrue Mion, PLLC

(57) ABSTRACT

A photographing system according to one example embodiment includes a hardware photographing device configured to photograph each of a first pattern and a second pattern; at least one memory storing instructions; and at least one processor configured to execute the instructions to: set, for the hardware photographing device, a control value for changing the focal position; evaluate degrees of focus of a plurality of images of the first pattern and select an image having a maximum evaluation value, as well as evaluate degrees of focus of a plurality of images of the second pattern and select an image having a maximum evaluation value; and acquire a correspondence relationship between a focal position of an optical system and a control value, based on the control values used in capturing the images of the first pattern and the second pattern, and subject distances of the first pattern and the second pattern.

9 Claims, 16 Drawing Sheets

(51) Int. Cl.
*G02B 7/04* (2021.01)
*G02B 7/36* (2021.01)
*H04N 23/67* (2023.01)

(56) References Cited

U.S. PATENT DOCUMENTS

| | | | |
|---|---|---|---|
| 11,525,978 B2* | 12/2022 | Kubo | H04N 23/67 |
| 2012/0261474 A1* | 10/2012 | Kawashime | G02B 7/32 |
| | | | 235/462.27 |
| 2019/0356860 A1* | 11/2019 | Sakai | G02B 7/04 |

* cited by examiner

PHOTOGRAPHING SYSTEM, CALIBRATION METHOD, AND NON-TRANSITORY COMPUTER-READABLE MEDIUM STORING PROGRAM

This application is a National Stage Entry of PCT/JP2020/022714 filed on Jun. 9, 2020, the contents of all of which are incorporated herein by reference, in their entirety.

TECHNICAL FIELD

This disclosure relates to a photographing system, a calibration method, and a non-transitory computer-readable medium storing a program.

BACKGROUND ART

In a field of industrial cameras and small cameras, a technique of focusing by using a liquid lens is used as a means of focusing on a subject. The liquid lens is a type of lens that changes focus by using a technique called electrowetting in which a curvature of a droplet changes according to a voltage value to be given. In a liquid lens mounted on an optical axis of an optical system, a curvature of the lens can be changed by changing a voltage value to be given, and a forming position of an image can be changed by refracting an incident light beam into the optical system. Therefore, the liquid lens can be used as an optical system having a variable focal position.

When an optical system including the liquid lens is used for an industrial camera, biometric authentication, or the like, it is necessary to scan a focal position of the liquid lens on subjects having different depth positions in order for the optical system to capture a focused image. Alternatively, in order to capture a focused image, the optical system needs to measure depth information of the subject and change lens voltage in such a way as to align the focal position with a subject position.

Patent Literature 1 discloses a liquid lens system to which an AC voltage is input. In this lens system, a focal position is constantly fluctuated due to amplitude of the input voltage being a sine wave, and an image in focus at a plurality of depth positions is generated by using a pulse signal synchronized with a phase of a sine wave of a drive signal. In the technique disclosed in Patent Literature 1, a calibration tool having different surface heights is used in order to acquire a depth of focus (in-focus region) with respect to a certain input voltage. Specifically, an image detection unit of the lens system detects a surface image of the calibration tool, and detects two positions at which contrast is maximized in the surface image, thereby acquiring a depth of focus.

CITATION LIST

Patent Literature

[Patent Literature 1] Japanese Unexamined Patent Application Publication No. 2019-203928

SUMMARY OF INVENTION

Technical Problem

An object of this disclosure is to provide a photographing system, a calibration method, and a non-transitory computer-readable medium storing a program that are capable of focusing on a desired position.

Solution to Problem

A photographing system according to the present example embodiment includes: a hardware photographing device configured to photograph each of a first pattern and a second pattern provided at a subject distance different from that of the first pattern a plurality of times at a focal position different for each time; at least one memory storing instructions; and at least one processor configured to execute the instructions to: set, for the hardware photographing device, a control value for changing the focal position; evaluate degrees of focus of a plurality of images of the first pattern photographed by the hardware photographing device and select an image having a maximum evaluation value, as well as evaluate degrees of focus of a plurality of images of the second pattern photographed by the hardware photographing device and select an image having a maximum evaluation value; and acquire a correspondence relationship between a focal position of an optical system and a control value, based on the control values used in capturing the image of the first pattern and the image of the second pattern being selected, and subject distances of the first pattern and the second pattern.

A calibration method performed by a computer according to the present example embodiment includes: photographing, by a hardware photographing device, each of a first pattern and a second pattern provided at a subject distance different from that of the first pattern a plurality of times at a focal position different for each time; setting a control value for causing the hardware photographing device to change the focal position; evaluating degrees of focus of a plurality of images of the first pattern photographed by the hardware photographing device and selecting an image having a maximum evaluation value, as well as evaluating degrees of focus of a plurality of images of the second pattern photographed by the hardware photographing device and selecting an image having a maximum evaluation value; and acquiring a correspondence relationship between a focal position of an optical system and a control value, based on the control values used in capturing the selected image of the first pattern and the selected image of the second pattern, and subject distances of the first pattern and the second pattern.

A non-transitory computer-readable medium according to the present example embodiment stores a program that causes a computer to execute: photographing, by a hardware photographing device, each of a first pattern and a second pattern provided at a subject distance different from that of the first pattern a plurality of times at a focal position different for each time; setting a control value for causing the a hardware photographing device to change the focal position; evaluating degrees of focus of a plurality of images of the first pattern photographed by the a hardware photographing device and selecting an image having a maximum evaluation value, as well as evaluating degrees of focus of a plurality of images of the second pattern photographed by the a hardware photographing device and selecting an image having a maximum evaluation value; and acquiring a correspondence relationship between a focal position of an optical system and a control value, based on the control values used in capturing the selected image of the first pattern and the selected image of the second pattern, and subject distances of the first pattern and the second pattern.

EXAMPLE EMBODIMENT

First Example Embodiment

Hereinafter, example embodiments of this disclosure will be described with reference to the drawings. First, a first example embodiment will be described.

Figure 1:
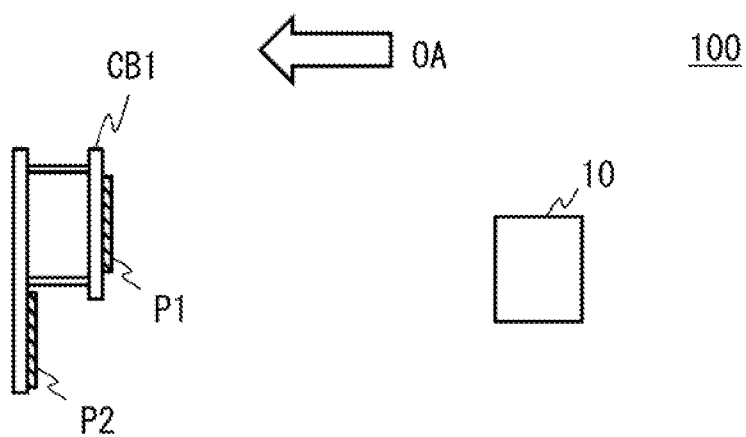
FIG. 1 is a schematic diagram illustrating a photographing system according to a first example embodiment.

FIG. 1 is a schematic diagram of a photographing system according to the first example embodiment. FIG. 1 is a top view of a photographing system 100, and illustrates a state in which a photographing device 10 captures patterns P1 and P2 of a calibration apparatus CB1 as subjects. The calibration apparatus CB1 has the pattern P1 (first pattern) and the pattern P2 (second pattern) of which subject distance (distance from the photographing device 10 in an optical axis direction OA) between the photographing device 10 is different from that of the pattern P1. The pattern P1 and the pattern P2 may be different patterns or may be identical patterns.

In FIG. 1, a step in the optical axis direction OA is provided between the pattern P1 and the pattern P2 in the calibration apparatus CB1 and thereby a subject distance between the pattern P1 and the photographing device 10 and a subject distance between the pattern P2 and the photographing device 10 are made different from each other. Here, the pattern P1 and the pattern P2 (and boards on which they are formed) are provided perpendicularly to the optical axis direction OA. However, the configuration of the calibration apparatus CB1 in which the subject distance between the pattern P1 and the photographing device 10 and the subject distance between the pattern P2 and the photographing device 10 are different is not limited thereto. For example, at least one of the pattern P1 and the pattern P2 may not be provided perpendicularly to the optical axis direction OA. As the pattern, any pattern such as a printed matter or an electronic display can be used.

Figure 2:
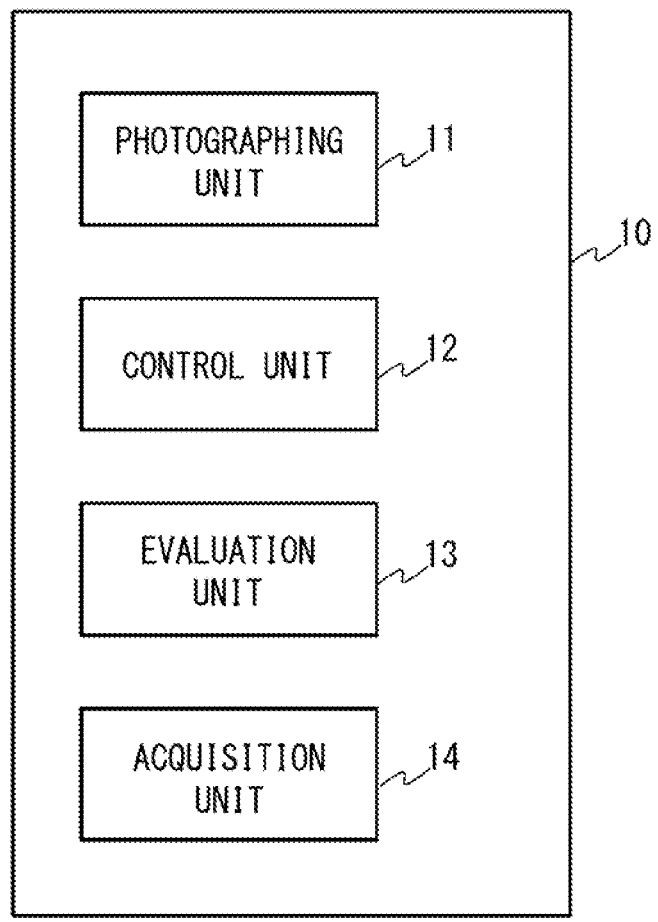
FIG. 2 is a block diagram illustrating a photographing device according to the first example embodiment.

Next, a configuration of the photographing device 10 will be described with reference to FIG. 2. The photographing device 10 includes a photographing unit 11, a control unit 12, an evaluation unit 13, and an acquisition unit 14, and can photograph at least one of a still image and a moving image.

The photographing unit 11 includes an optical system capable of changing a focal position, and includes, for example, a variable focus lens. The variable focus lens may be one in which lens focusing is performed mechanically or by using a liquid lens. The photographing unit 11 photographs the pattern P1 of the calibration apparatus a plurality of times at different focal positions. The photographing unit 11 also photographs the pattern P2 of the calibration apparatus a plurality of times at different focal positions. Note that "a plurality of times" refers to any number of times of two or more.

Note that, the photographing unit 11 may simultaneously photograph the pattern P1 and the pattern P2 with one photographing operation, or may individually photograph the pattern P1 and the pattern P2. In a case in which the pattern P1 and the pattern P2 are photographed simultaneously by one photographing operation, a plurality of images photographed at different focal positions can be acquired with regard to the pattern P1 and the pattern P2 by performing photographing a plurality of times at different focal positions. In a case in which the pattern P1 and the pattern P2 are individually photographed, the number of times the pattern P1 is photographed and the number of times the pattern P2 is photographed may be the same or may be different.

The control unit 12 sets a control value for causing the photographing unit 11 to change a focal position. The photographing unit 11 changes the focal position in accordance with the control value, and performs photographing. When the photographing unit 11 photographs the pattern P1 and the pattern P2 at the same time by one photographing operation, the pattern P1 and the pattern P2 are photographed at the same focal position. The control value is, for example, a parameter such as a voltage value, a current value, and a frequency, and the focal position of the photographing unit 11 is changed when the parameter is changed by a control signal from the control unit 12.

The evaluation unit 13 evaluates degrees of focus (a degree to which the photographed pattern is in focus) of the plurality of images of the pattern P1 and the plurality of images of the pattern P2 photographed by the photographing unit 11. As the photographed pattern is in focus, the evaluation unit 13 calculates the evaluation value to be higher. The evaluation unit 13 selects an image having a largest evaluation value from each of the plurality of images of the pattern P1 and the plurality of images of the pattern P2.

The acquisition unit 14 acquires the control values used by the control unit 12 when the image of the pattern P1 and the image of the pattern P2 selected by the evaluation unit 13 are captured. The acquisition unit 14 also acquires information on the subject distances of the pattern P1 and the pattern P2. Information on the control values is stored in the acquisition unit 14 or a storage unit (not illustrated) at the time of image capturing. Further, the information on the subject distance is stored in the acquisition unit 14 or the storage unit as known information.

The acquisition unit 14 acquires the correspondence relationship between the focal position of the optical system and the control value, based on the acquired information. The acquisition unit 14 can calculate the relationship between the focal position and the control value from the control value when the pattern P1 and the pattern P2 are in focus. In addition, an image of which evaluation value of the pattern P1 or the pattern P2 is maximized can be regarded as in a state in which the pattern is in focus (in other words, an in-focus position at which the evaluation value of a captured image is maximized can be regarded as the subject distance of the pattern P1 or P2). Therefore, it can be said that the control value when the evaluation value of the pattern P1 becomes maximum is a control value for setting the focal position of the photographing unit 11 to a focal position for the pattern P1, and the control value when the evaluation value of the pattern P2 becomes maximum is a control value for setting a focal position of the photographing unit 11 to a focal position for the pattern P2. In such a way, the correspondence relationship between the focal position of the optical system and the control value can be acquired.

For example, it is known for a liquid lens that the relationship of refractive power D (an inverse number 1/f of a focal distance, and f is the same value as a focal position) of the lens with respect to input voltage V becomes almost linear across an effective region, and is expressed by the following Math (1).

$$D = 1/f = aV + b \quad (1)$$

A liquid lens is often used in combination with a general fixed focus lens or the like, and a total focal distance and refractive power are different from Math (1), but when refractive power of a liquid lens is D and refractive power of a combined lens is D', total refractive power can be approximated as D+D'. Therefore, an optical system using the liquid lens has the following relationship with respect to voltage.

$$D = aV + b - D' \quad (2)$$

Since D' is a fixed value, D' can be integrated into a linear parameter b. Therefore, in order to focus the liquid lens at a desired position, it is necessary to calculate parameters a and b, which are parameters for determining the relationship of the refractive power D with respect to the input voltage V.

When an electrowetting liquid lens is used for object detection, biometric authentication, or the like, it is assumed that the lens is operated on an assumption that only one position (or one plane) is always in focus at one fixed voltage value. Therefore, in operation, it is necessary to recognize a correspondence relationship of a focal position (a position at which an image of a subject is formed on an image sensor by a lens system) with respect to a voltage value. Although a method disclosed in Patent Literature 1 obtains a depth of focus, the method does not obtain this correspondence relationship.

Figure 3:
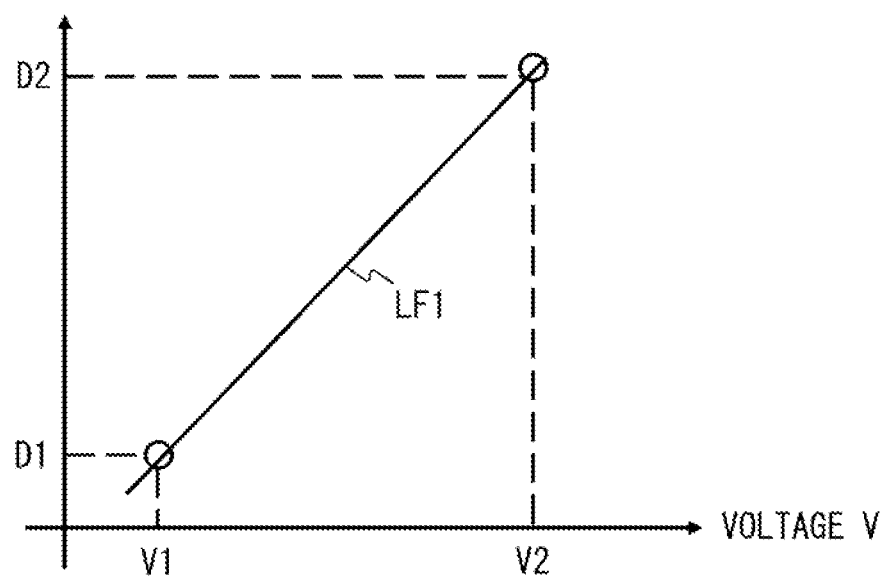
FIG. 3 is a graph illustrating a relationship between refractive power D and an optimum voltage value V according to the first example embodiment.

For example, it is assumed that the photographing unit 11 has a relationship of the refractive power D (an inverse number 1/f of the focal position) of the lens with respect to the input voltage V illustrated in the above-described Math (2). It is assumed that refractive power at a voltage value V1, which is the control value, is D1 (the focal position is f1), and refractive power at a voltage value V2 is D2 (the focal position is f2). In this case, correspondence between the focal position (inverse number of the focal position) of the optical system and the control value is as illustrated in FIG. 3. The acquisition unit 14 calculates a linear function LF1, based on sets of the voltage value V1 and the refractive power D1, and the voltage value V2 and the refractive power D2. By this linear function LF1, the photographing device 10 can calculate a voltage value adjusted to any focal position.

Figure 4:
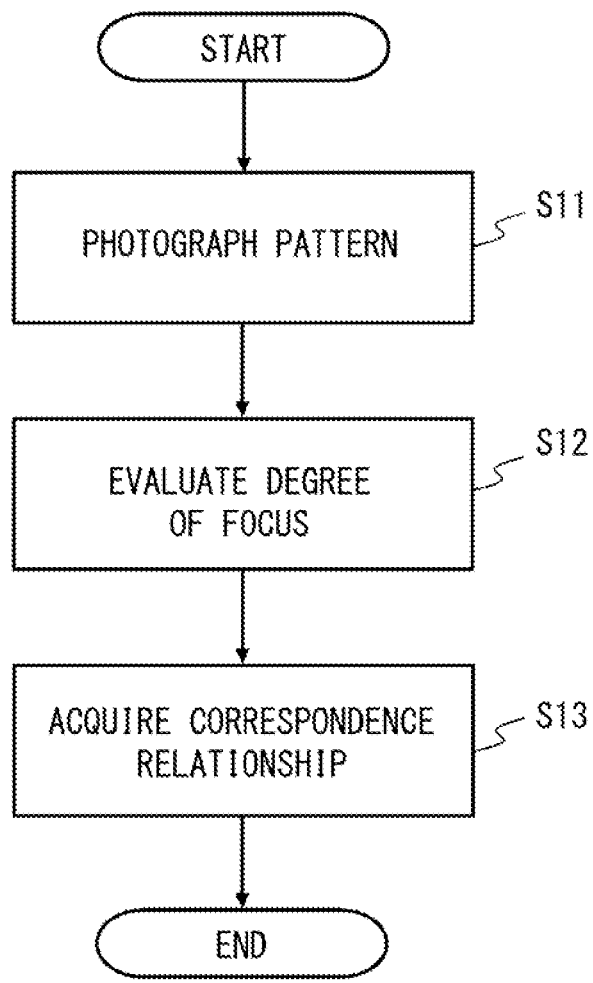
FIG. 4 is a flowchart illustrating a calibration processing according to the first example embodiment.

FIG. 4 is a flowchart illustrating a calibration processing performed by the photographing device 10 for focusing. First, the photographing unit 11 photographs each of the pattern P1 and the pattern P2 of the calibration apparatus CB1 at different focal positions a plurality of times (step S11). At the time of image capturing, the control unit 12 sets a control value for causing the photographing unit 11 to change the focal position.

Next, the evaluation unit 13 evaluates degrees of focus of the plurality of images of the pattern P1 photographed by the photographing unit 11, and selects an image having a largest evaluation value. Further, the evaluation unit 13 evaluates degrees of focus of the plurality of images of the second pattern photographed by the photographing unit 11, and selects an image having a largest evaluation value (step S12).

The acquisition unit 14 acquires the correspondence relationship between the focal position of the optical system and the control value on the basis of the control values used in capturing the image of the pattern P1 and the image of the pattern P2 selected by the evaluation unit 13, and subject distances of the pattern P1 and the pattern P2 (step S13).

As described above, by acquiring the correspondence relationship between the focal position of the optical system and the control value, the photographing device 10 can obtain a control value for any focal position. Therefore, it is possible to focus on a desired position.

Second Example Embodiment

Figure 5:
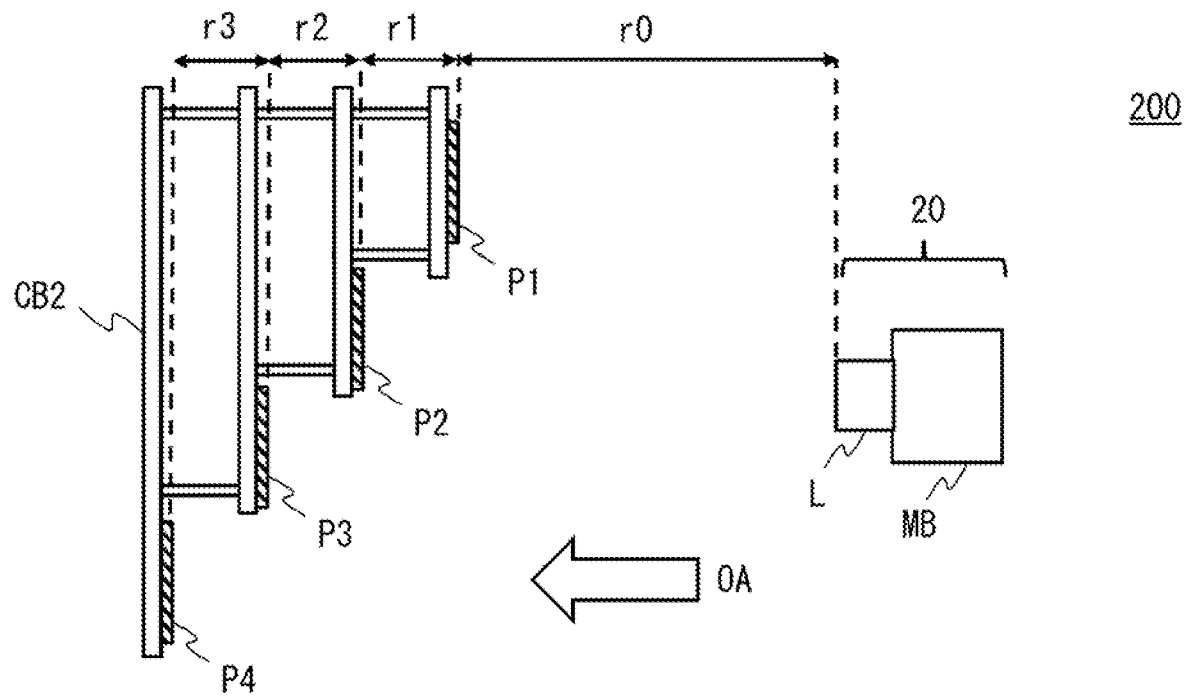
FIG. 5 is a schematic diagram illustrating a photographing system according to a second example embodiment.

Next, a second example embodiment will be described with reference to the drawings. FIG. 5 is a schematic diagram of a photographing system according to a second example embodiment. FIG. 5 is a top view of a photographing system 200, and illustrates a state in which a photographing device 20 including a lens unit L and a camera body MB captures patterns P1 to P4 of a calibration board CB2 as subjects.

The patterns of the calibration board CB2, which are the pattern P1, the pattern P2, the pattern P3, and the pattern P4, are provided in ascending order of subject distance from the photographing device 20. Stepped surfaces are formed on the calibration board CB2, and the calibration beard CB2 is installed in such a way as that the stepped surfaces are perpendicular to an optical axis direction OA of the photographing device 20. Each of the patterns P1 to P4, which can be identified by the photographing device 20, is formed on each of the stepped surfaces. Therefore, the photographing device 20 can photograph the patterns P1 to P4 from a front thereof. The stepped surfaces on which the patterns are formed are arranged in a horizontal direction.

Further, the pattern P1 and the pattern P2 are separated from each other by r1 in the optical axis direction OA, the pattern P2 and the pattern P3 are separated from each other by r2 in the optical axis direction OA, and the pattern P3 and the pattern P4 are separated from each other by r3 in the optical axis direction OA. Note that, the pattern P1 and the lens unit L of the photographing device 20 are separated from each other by r0 in the optical axis direction OA. The subject distances r0 to r3 are stored in the photographing device 20 and are fixed values at least while the photographing device 20 captures each of the patterns.

Figure 6:
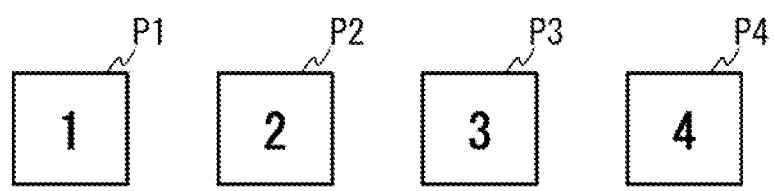
FIG. 6 is a diagram illustrating patterns according to the second example embodiment.

FIG. 6 is a diagram illustrating patterns P1 to P4. Each of the patterns P1 to P4 has a different pattern, and the patterns of numbers "1" to "4" are described herein. Note that, the pattern described may be a letter other than number or a pattern such as an augmented reality (AR) marker.

Figure 7:
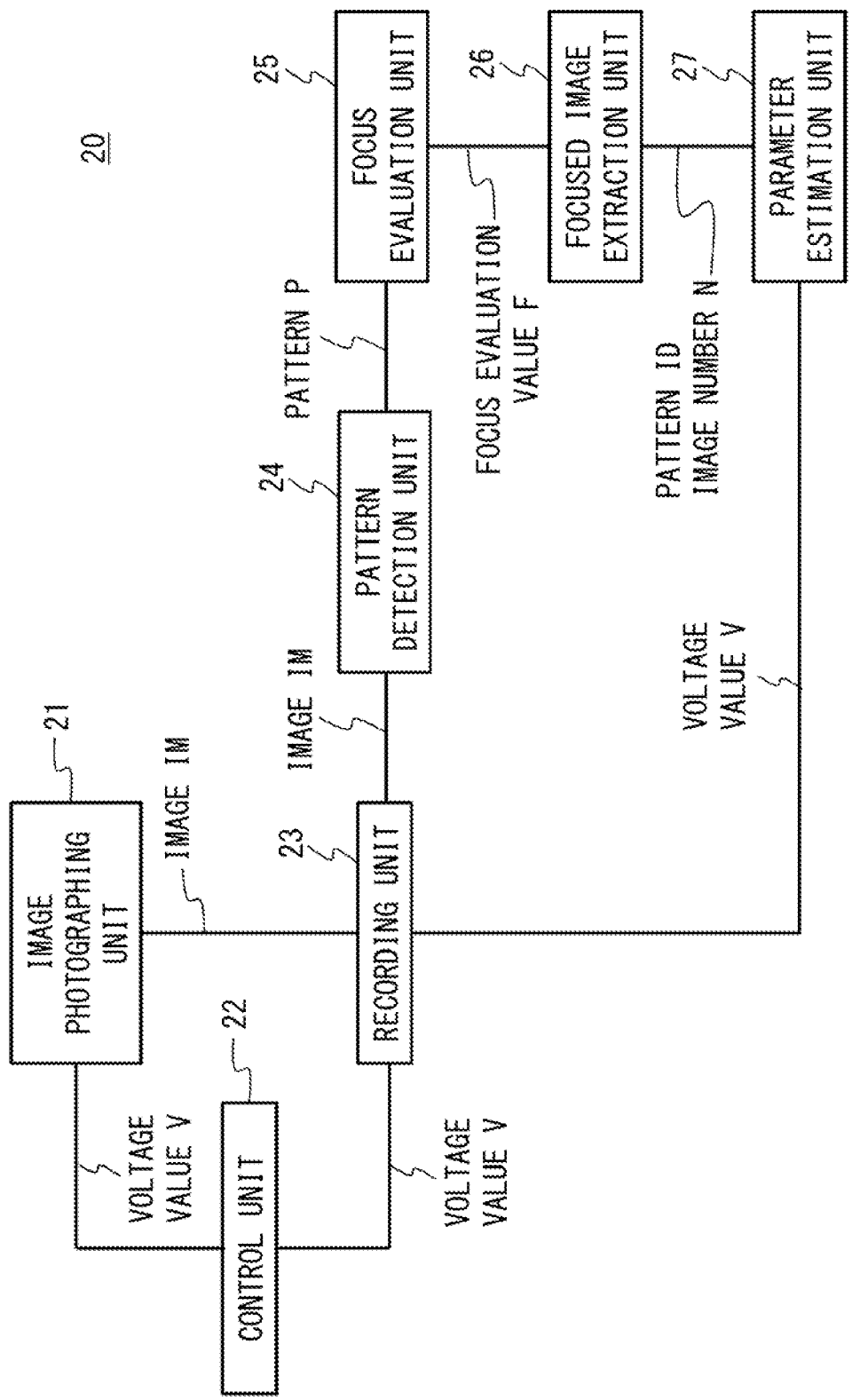
FIG. 7 is a block diagram illustrating a configuration of a photographing device according to the second example embodiment.

Next, a configuration of the photographing device 20 will be described with reference to FIG. 7. The photographing device 20 includes an image photographing unit 21, a control unit 22, a recording unit 23, a pattern detection unit 24, a focus evaluation unit 25, a focused image extraction unit 26, and a parameter estimation unit 27.

The image photographing unit 21 is a part constituting the lens unit L illustrated in FIG. 5, and is a single photographing unit having a liquid lens as a variable focus lens. The image photographing unit 21 controls a focal position of the liquid lens, based on a control signal of a voltage value V output from the control unit 22. A focal position of an optical system is changed by changing refractive power of the liquid lens according to a change in the voltage value V. The image photographing unit 21 outputs photographed images IM to the recording unit 23. As will be described later, the image photographing unit 21 outputs the images IM, which were photographed a plurality of times at different focal positions, and image numbers thereof to the recording unit 23.

The control unit 22 controls the refractive power by changing a curvature of the liquid lens by outputting the control signal of the voltage value V to the liquid lens of the image photographing unit 21. The control unit 22 also outputs the control signal of the voltage value V to the recording unit 23. Further, the control unit 22 controls other units of the photographing device 20 and causes the other units to execute processing related to photographing.

The recording unit 23 records the image IM captured by the image photographing unit 21 and the image number, in association with the control signal (that is, a signal indicating the focal position of the optical system) of the voltage value V output by the control unit 22 when the image IM is photographed. The recording unit 23 outputs data of the image IM and the image number to the pattern detection unit 24. Further, the recording unit 23 outputs information on the voltage value V to the parameter estimation unit 27 in response to a request from the parameter estimation unit 27.

The pattern detection unit 24 detects a pattern on the calibration board CB2 for each of the plurality of acquired images. Each of the patterns P1 to P4 is stored in an unillustrated storage unit of the photographing device 20 as a known pattern in association with an ID for identifying a pattern and a subject distance (depth information) of each of the patterns. For each of the images, the pattern detection unit 24 detects all the captured patterns by using the stored patterns. As a pattern detection method, a known technique (for example, template matching) can be used. The pattern detection unit 24 associates data of a detected pattern P, an image number of an image from which the pattern is detected, and an ID for identifying the pattern, and outputs the data to the focus evaluation unit 25.

Note that, the pattern detection unit 24 can detect a pattern even when the photographed pattern image is not completely in focus, as long as the photographed subject is stationary. In addition, even when the focal position is changed, an angle of view in capturing (an angle representing an actual range captured by a camera) does not change. Therefore, a position of each pattern in the image captured by the image photographing unit 21 does not change. By using this, a pattern on an image may be detected by specifying a region corresponding to each pattern on the image in advance.

The focus evaluation unit 25 performs focus evaluation on a region of the pattern P detected by the pattern detection unit 24, and calculates a degree of focus of the photographed pattern as a focus evaluation value. The focus evaluation unit 25 may evaluate a focus evaluation value by looking at a contrast difference between the images or a high-frequency component of each of the images. The focus evaluation unit 25 associates the calculated focus evaluation value, an image number of an image from which the pattern for which the calculation is performed is detected, and an ID for identifying the pattern, and outputs the associated evaluation value, image number, and ID to the focused image extraction unit 26.

The focused image extraction unit 26 selects an image number having a highest focus evaluation value for each pattern P. As a result, the focused image extraction unit selects, for each pattern P, one image having the highest focus evaluation value (that is, a most focused image) from the plurality of images photographed at different focal positions. In this way, the focused image extraction unit 26 extracts a set of each pattern and an image number having a highest focus evaluation value. The focused image extraction unit 26 outputs information of an extracted pattern ID and an extracted image number N to the parameter estimation unit 27.

The parameter estimation unit 27 acquires information on the pattern ID and the image number N from the focused image extraction unit 26. On the basis of the acquired pattern ID, the parameter estimation unit 27 acquires information on a subject distance associated with the acquired pattern ID from the storage unit (not illustrated) of the photographing device 20.

As illustrated in FIG. 5, the subject distance between the pattern P1 and the photographing device 20 is r0. The subject distance between the pattern P2 and the photographing device 20 is (r0+r1), the subject distance between the pattern P3 and the photographing device 20 is (r0+r1+r2), and the subject distance between the pattern P4 and the photographing device 20 is (r0+r1+r2+r3). These subject distances can be replaced by the focal positions of the patterns.

The photographing device 20 stores these subject distances and parameters in the storage unit (not illustrated). Note that, the photographing device 20 may store all of the subject distances r0 to r3 in the storage unit, but may store two or more of the subject distances r0 to r3 and may not store the other subject distance(s). Four sets of relationships between an inverse of a focal position f and the parameters a and b, which will be described later, can be acquired by detecting four different patterns. Therefore, for example, even when the subject distance r0 is not stored, the photographing device 20 can obtain the parameters a and b and the subject distance r0 (or a focal position relevant to the subject distance r0).

Further, the parameter estimation unit 27 requests the recording unit 23 to output information on the voltage value V when the image of the acquired image number N is photographed. As described above, in response to the request, the recording unit 23 outputs the information on the voltage value V to the parameter estimation unit 27.

The parameter estimation unit 27 estimates a linear parameter, based on the voltage value V relevant to the image number N acquired as described above and information on the focal position f of each pattern. The linear parameter can be estimated, for example, by using a linear regression method.

Next, an example of the image photographed by the photographing device 20 will be described with reference to FIGS. 8 to 11. FIGS. 8 to 11 illustrate a plurality of images (an image group) each photographed by the image photographing unit 21 in a state in which the focal position of the optical system is changed. In FIGS. 8 to 11, the more in focus and clearly photographed each pattern is, the larger the pattern is displayed, and the more out of focus and blurry photographed each pattern is, the smaller the pattern is displayed.

Figure 8:
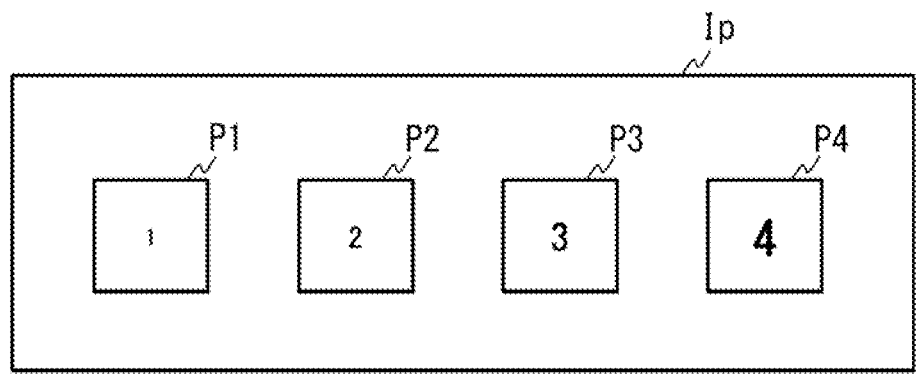
FIG. 8 is a diagram illustrating an image photographed by the photographing device according to the second example embodiment.

In an image Ip illustrated in FIG. 8, the pattern P4 is photographed in focus, the pattern P3 is photographed out of focus and blurred, and the pattern P2 is photographed more out of focus and blurred than the pattern P3. Further, the pattern P1 is photographed in a most out-of-focus state. In an image In illustrated in FIG. 9, the pattern P3 is photographed in focus, the pattern P2 and the pattern P4 are photographed slightly out of focus, and the pattern P1 is photographed in a most out-of-focus state. In an image Im illustrated in FIG. 10, the pattern P2 is photographed in focus, the pattern P1 and the pattern P3 are photographed slightly out-of-focus, and the pattern P4 is photographed in a most out-of-focus state. In an image Ik illustrated in FIG. 11, the pattern P1 is photographed in focus, the pattern P2 is photographed out of focus, and the pattern P3 is photographed more out of focus than the pattern P2. Further, the pattern P4 is photographed in a most out-of-focus state.

The images Ip, In, Im, and Ik are photographed by using control signals of voltage values Vp, Vn, Vm, and Vk, respectively, and the image Ip and the voltage value Vp, the image In and the voltage value Vn, the image Im and the voltage value Vm, and the image Ik and the voltage value Vk are respectively associated and are recorded in the recording unit 23. The voltage values increase by $\Delta V$ ($>0$) in an order of Vp, Vn, Vm, Vk. From this, it can be seen that as the voltage value of the control signal is increased, the pattern having longer subject distance (that is, a pattern located further back) is in focus.

Figure 9:
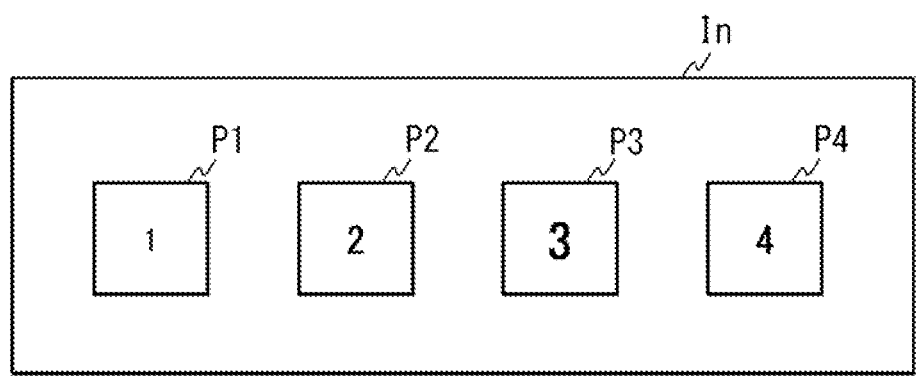
FIG. 9 is a diagram illustrating an image photographed by the photographing device according to the second example embodiment.
Figure 10:
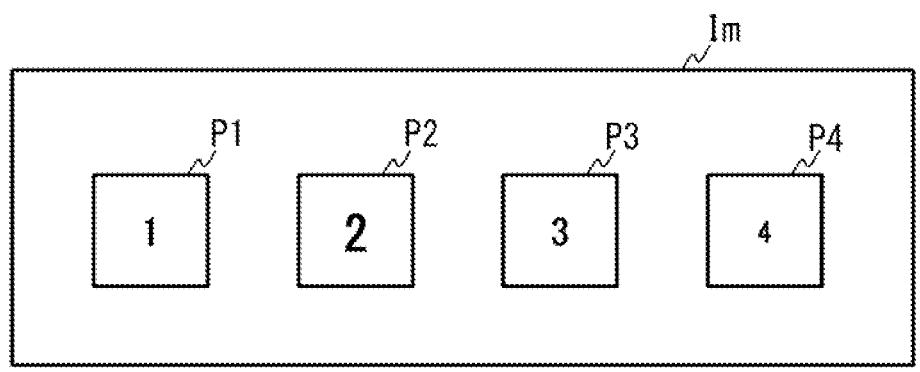
FIG. 10 is a diagram illustrating an image photographed by the photographing device according to the second example embodiment.
Figure 11:
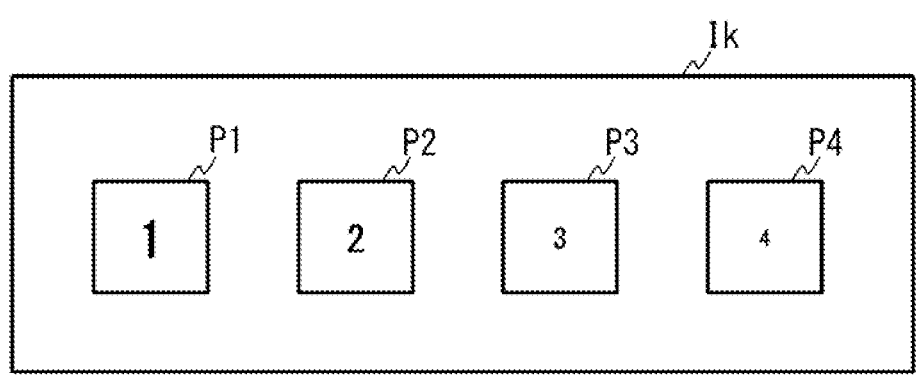
FIG. 11 is a diagram illustrating an image photographed by the photographing device according to the second example embodiment.
Figure 12:
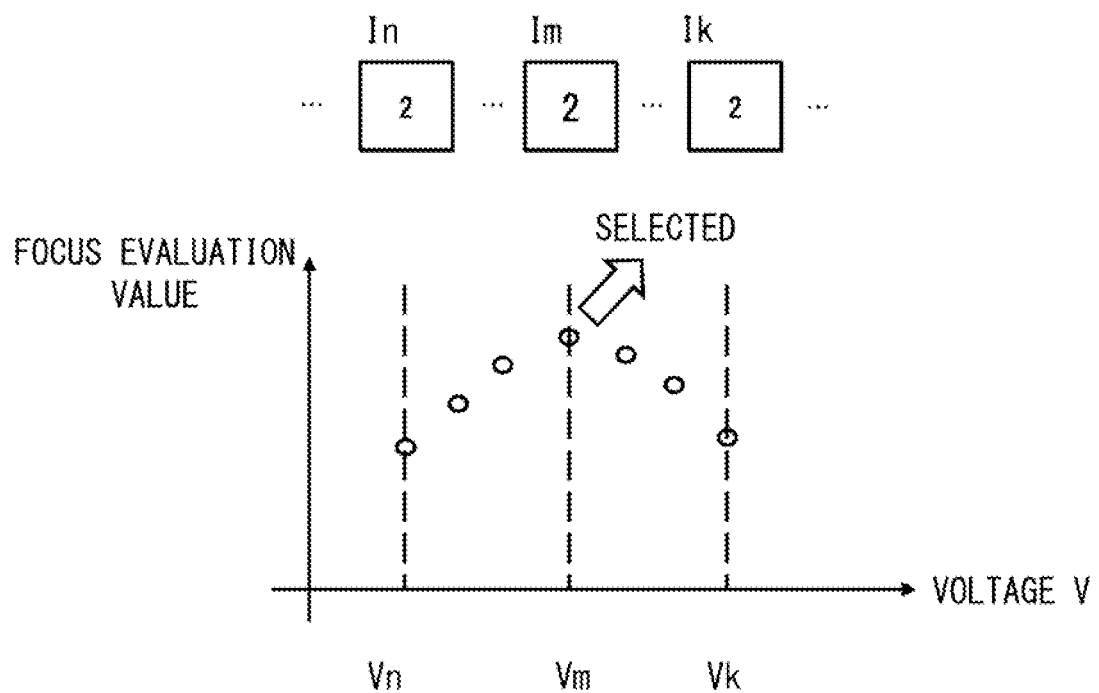
FIG. 12 is a diagram illustrating a relationship between a pattern and a focus evaluation value according to the second example embodiment.

FIG. 12 is an explanatory diagram illustrating a relationship between the pattern P2 detected in each frame and the focus evaluation values in the image group In to Ik illustrated in FIGS. 9 to 11. The graph in a lower part of FIG. 12 illustrates a result of focus degree evaluation performed on the same pattern, pattern P2, in an order of acquired images in a case where the voltage value V is sequentially increased to Vn, Vm, and Vk. As illustrated in this graph, distribution of the focus evaluation values has a mountain-shaped structure with the image Im (voltage Vm), which is photographed most in-focus, at a peak. Therefore, it can be seen from FIG. 12 that a voltage value for the subject distance of the pattern P2 is Vm. Such a voltage value is hereinafter referred to as an optimum voltage value. The focused image extraction unit 26 selects the image Im relevant to the voltage value Vm.

Figure 13:
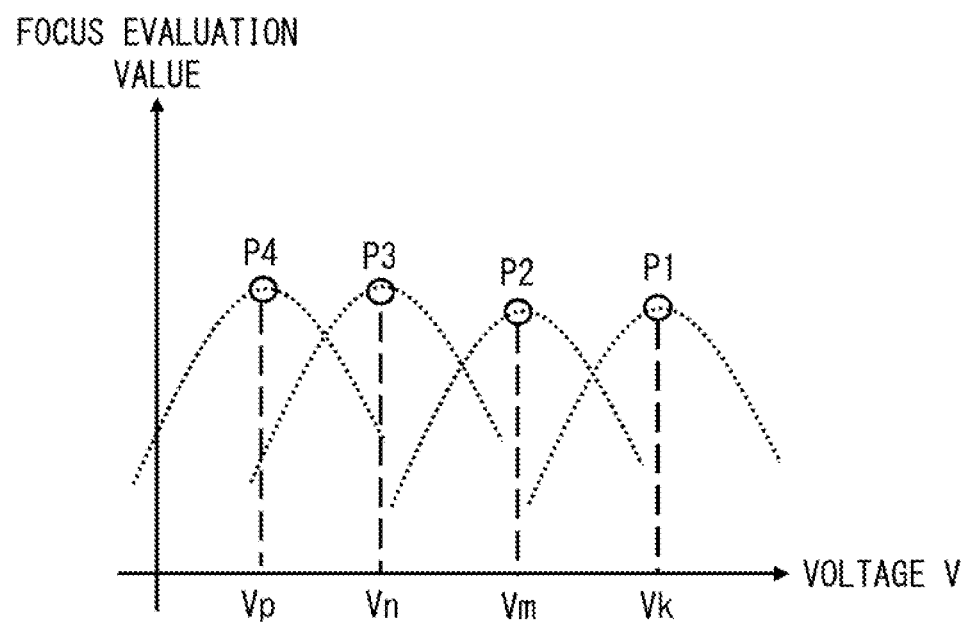
FIG. 13 is a diagram illustrating a relationship between an optimum voltage value and a focus evaluation value of the patterns according to the second example embodiment.

FIG. 13 is a graph illustrating a relationship between an optimum voltage value and a focus evaluation value of each acquired pattern. An image photographed in a most in-focus state (and an optimum voltage value) differs depending on the subject distance of each pattern. Also, the pattern detection unit 24 still performs pattern detection itself at a voltage value before and after the optimum voltage value. Therefore, the evaluation values of each pattern are plotted in a shape of an arch. As illustrated in FIG. 13, an optimum voltage value Vk is a peak of an arch of the pattern P1, an optimum voltage value Vm is a peak of an arch of the pattern P2, an optimum voltage value Vn is a peak of an arch of the pattern P3, and an optimum voltage value Vp is a peak of an arch of the pattern P4.

Figure 14:
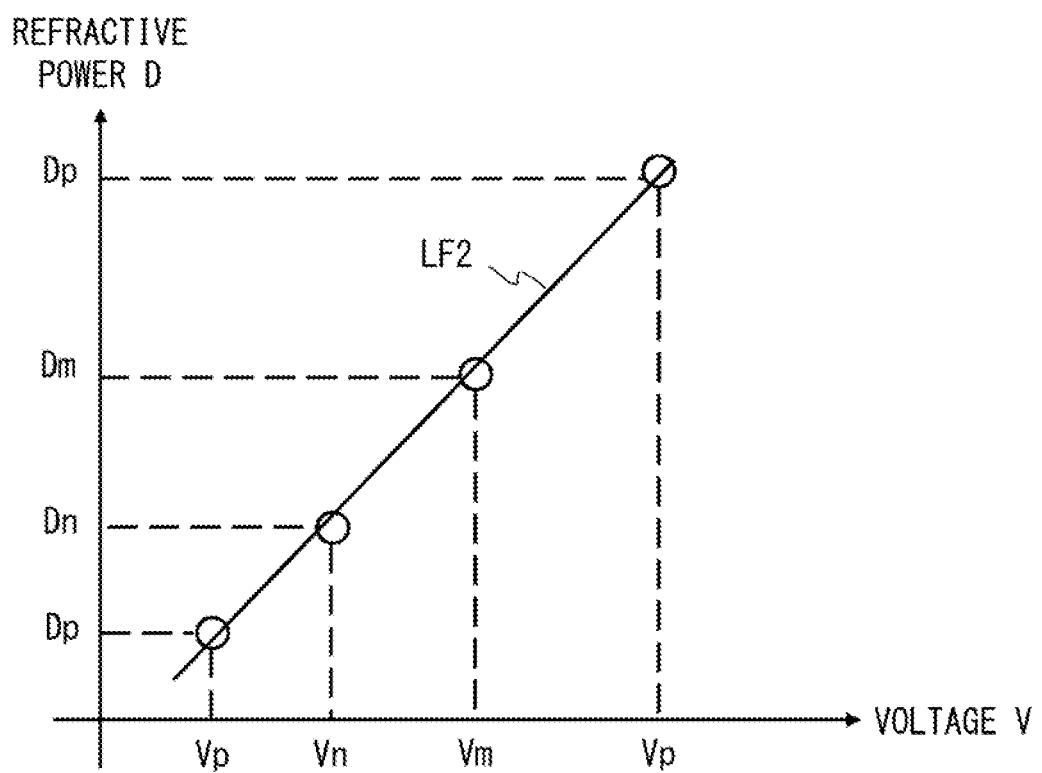
FIG. 14 is a graph illustrating a relationship between refractive power D and an optimum voltage value V according to the second example embodiment.

FIG. 14 is a graph illustrating the relationship between the refractive power D, which is an inverse number of a focal position f, and the optimum voltage value V for each acquired pattern. As expressed in Math (1) described above, the refractive power D and the voltage value V have a linear relationship. Therefore, the parameter estimation unit 27 linearly fits correspondence between an inverse number of the focal position f of the acquired pattern and the voltage value, and obtain a linear function LF2. Using this linear function LF2, the parameters a and b can be easily estimated. As a result, the photographing device 20 can focus the liquid lens at a predetermined position.

Figure 15:
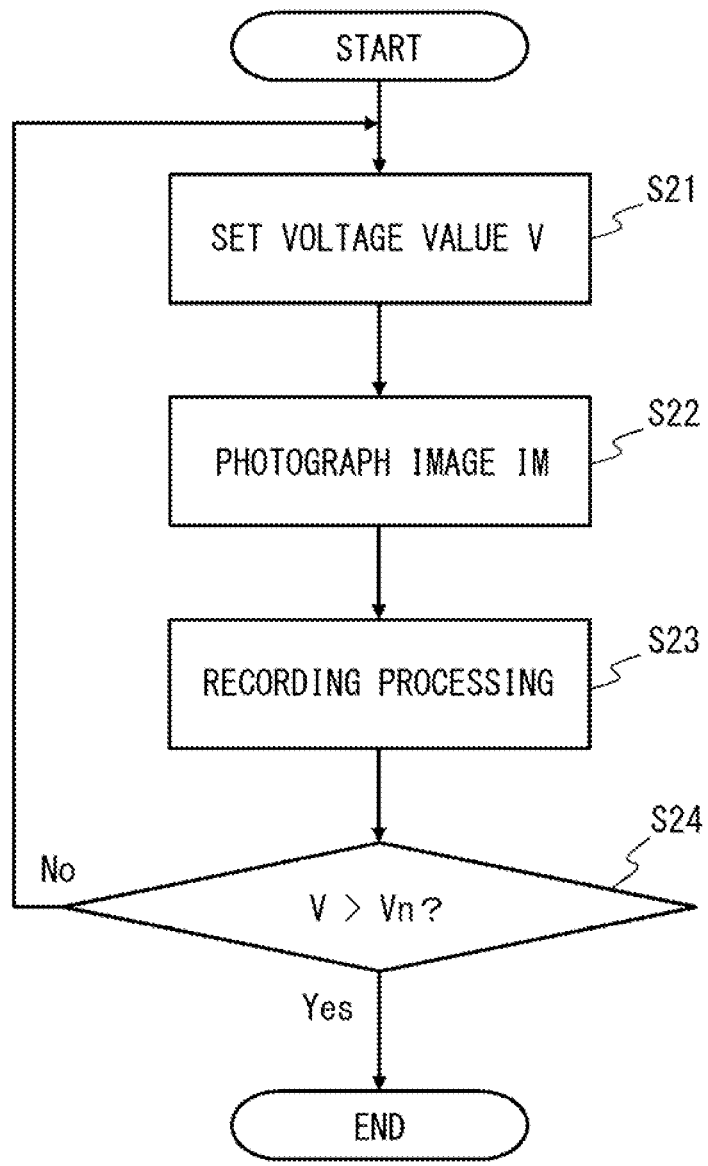
FIG. 15 is a flowchart illustrating a photographing processing in a calibration processing according to the second example embodiment.

Next, a calibration processing performed by the photographing device 20 for focusing will be described with reference to FIGS. 15 and 16. FIG. 15 is a flowchart illustrating a photographing processing in a calibration process.

First, the control unit 22 sets, for photographing, a voltage value V to be output to the image photographing unit 21 (step S21). The voltage value V is set to an initial value V0 at a start of photographing, and is set to a value that is increased by a constant value $\Delta V$ from an immediately preceding value when an image is photographed repeatedly. By setting the voltage value V, a focal position of the liquid lens is set.

Next, the image photographing unit 21 photographs one image IM in which all of the patterns P1 to P4 is photographed (step S22). After photographing of the one image is completed, the recording unit 23 records the image photographed by the image photographing unit 21 and the voltage V at the time of photographing (step S23).

The photographing device 20 determines whether the current voltage value V exceeds a predetermined value Vn (step S24). When the voltage value V does not exceed the predetermined value Vn (No in step S24), the photographing device 20 returns to step S21, sets the voltage value as V+$\Delta V$, and photographs the image IM.

When the voltage value V exceeds the predetermined value Vn (Yes in step S24), the photographing device 20 ends the photographing. At this point, the photographing device 20 is in a state in which a series of image groups in which the focal position is continuously changed for each image is acquired. Note that, $\Delta V$ is, for example, a value acquired by dividing the difference between V0 and Vn by any natural number, and as ΔV becomes a smaller value, the number of images (number of samples) photographed in steps S21 to S24 increases.

Figure 16:
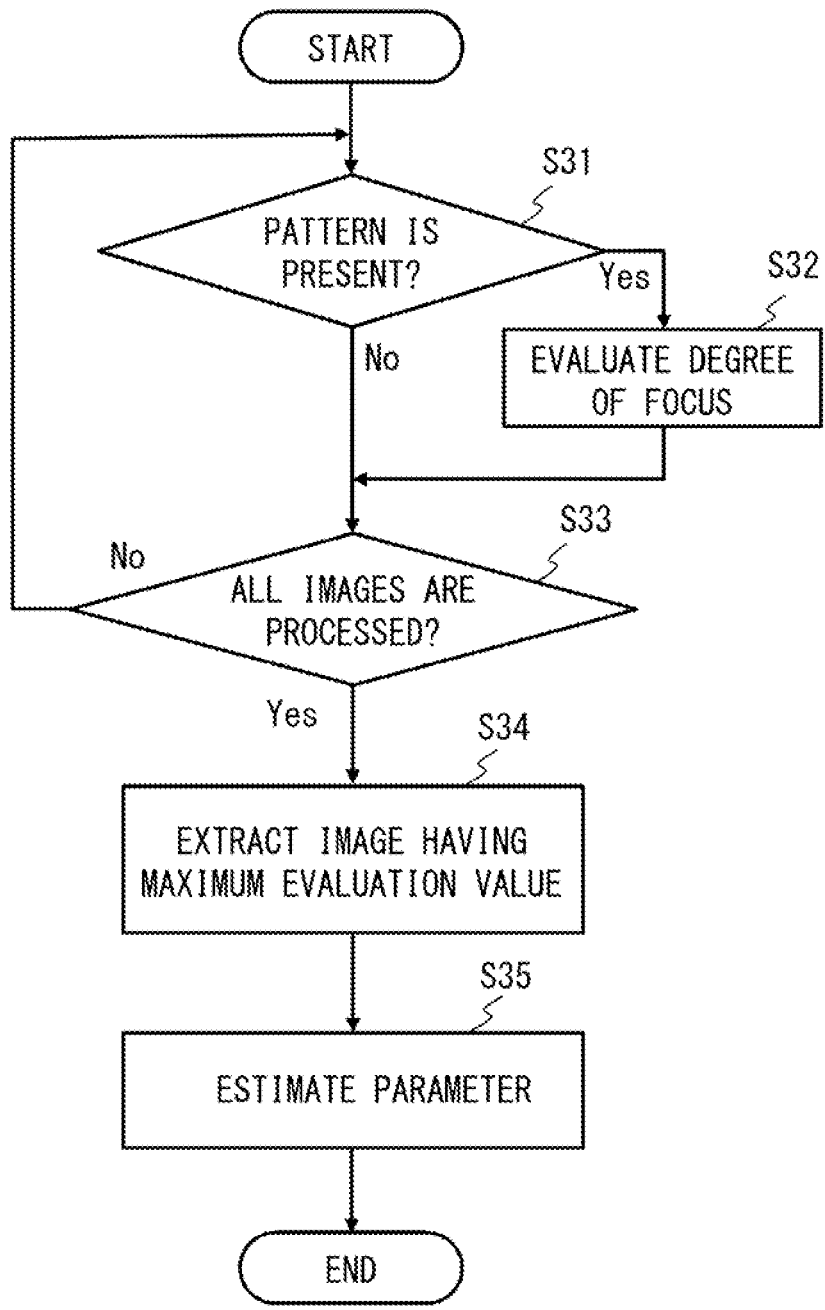
FIG. 16 is a flowchart showing a parameter detection processing in the calibration processing according to the second example embodiment.

FIG. 16 is a flowchart illustrating a parameter detection processing in the calibration process. First, the pattern detection unit 24 detects the patterns P1 to P4 in one image in the acquired series of image groups (step S31).

In step S31, when at least one of the patterns P1 to P4 is detected in a target image (Yes in step S31), the pattern detection unit 24 outputs all the detected patterns to the focus evaluation unit 25. The focus evaluation unit 25 performs focus evaluation on all the detected patterns, and calculates a focus evaluation value F (step S32). The focus evaluation unit 25 associates the calculated focus evaluation value, an image number in which the pattern for which the calculation is performed is detected, and an ID for identifying the pattern, and outputs the associated evaluation value, image number, and ID to the focus image extraction unit 26.

After completion of the focus evaluation, the pattern detection unit 24 determines whether the pattern detection processing has been completed for all the images in the series of image groups (step S33). When none of the patterns P1 to P4 is detected in the target image in step S31 (No in step S32), the pattern detection unit 24 also performs the determination processing according to step S33.

When it is determined in step S33 that there is an image for which the pattern detection processing has not been performed (No in step S33), the pattern detection unit 24 selects the image for which the pattern detection processing has not been performed, returns to step S31, and performs the process.

When it is determined in step S33 that the pattern detection processing has been performed for all the images (Yes in step S33), the focused image extraction unit 26 selects, for each of the patterns P1 to P4, an image number having a highest focus evaluation value (step S34). Herein, a focal position at the time of photographing of the image having the highest focus evaluation value selected for each pattern can be determined to be at or near the focal position of each pattern. After acquiring the pattern ID of each pattern, the focused image extraction unit 26 outputs information on the extracted pattern ID and the extracted image number N to the parameter estimating unit 27.

On the basis of the acquired pattern ID, the parameter estimation unit 27 acquires information on the subject distance associated with the acquired pattern ID from the storage unit (not illustrated) of the photographing device 20. Then, the parameter estimation unit 27 calculates a focal position f of each pattern ID. Further, the parameter estimation unit 27 acquires, from the recording unit 23, information on the voltage value V when the image of the image number N is photographed. The parameter estimation unit 27 estimates the linear parameters by using the linear regression method, based on the voltage value V with respect to the image number N acquired as described above and information on the focal position f of each pattern (step S35).

In order to determine the above-described parameters a and b, it is necessary to acquire at least two sets of the voltage value V and the focal position f. As processing for this purpose, the following example is conceivable in addition to the above-described disclosed example. First, a user arranges a resolution chart (an example of a calibration apparatus) at each of two different points where a photographing subject of a photographing device is assumed to be located and a subject distance is known. Next, by controlling a voltage value, the photographing device is focused on each of the resolution charts at the two points, and the resolution charts are photographed as samples. Thereafter, the parameters a and b can be obtained by using the voltage value at the time of photographing.

In the above processing, the photographing processing and the parameter detection processing are performed on the two points having different subject distances. However, in order to estimate the parameters a and b more accurately (with less error), it is preferable that the number of captured points to be sampled is larger.

However, in this case, there is a problem that the numbers of times of the photographing processing and the parameter detection processing increase. Specifically, since it is necessary to provide the resolution charts in many locations, it takes time to install the resolution charts. Further, it is necessary to repeat a work of focusing on the resolution chart in each installation location. In particular, in a case of a camera system using a plurality of liquid lenses, the work is time-consuming, and a procedure is complicated.

Meanwhile, in the second example embodiment, the calibration board CB2 in which the subject distances of the patterns are different and are fixed is used as the calibration apparatus. Further, the photographing device 20 can capture all the patterns in one photographing operation. Therefore, since it is only necessary to arrange the calibration apparatus once in the calibration processing, it is possible to reduce time and effort for the calibration process.

Further, since the patterns are made different for each pattern having a different subject distance, the photographing device 20 can easily discriminate a pattern having a different subject distance by detecting a shape of the pattern and recognizing a different pattern. Therefore, the photographed image for each pattern having a different subject distance can be easily distinguished, and thus the photographing device 20 can easily perform the calibration processing.

In the second example embodiment, the above-described calibration processing is performed in the optical system including the liquid lens. As a result, the calibration processing can be performed quickly and easily as compared with a case in which a focal position of an optical system is mechanically adjusted (for example, a focal position of a glass lens is adjusted by turning a dial).

Further, the photographing device 20 performs the photographing processing while increasing the voltage value V by the constant value ΔV in a single continuous photographing, and detects, for each pattern, an image that is most in focus in a series of photographed image groups. Therefore, it is not necessary for the photographing device to repeat the operation of adjusting the focus of the photographing device for each pattern automatically or manually by a user, and it is possible to reduce time required for the calibration processing. As described above, the correspondence relationship between the input signal and the focal position can be acquired quickly and easily for the optical system using the liquid lens and having a variable focal position. Thereby, it is possible to focus the photographing device at a desired position.

The photographing device 20 can be applied to, for example, an iris photographing device. When iris authentication is performed by the iris photographing device, it is necessary to photograph a fine iris pattern, and therefore depth of field (in-focus range) in the photographing is narrow. For example, when the photographing device 20 photographs a stationary iris, accurate iris authentication can be performed by setting the depth of field at a location 50 cm to 70 cm away from the photographing device 20. In this case, a voltage value used for the liquid lens is appropriately changed within a limited range, and then scanning of the photographing is performed.

Since the voltage value used for the liquid lens is changed within the limited range, the parameters a and b expressed in Math (1) are likely to be changed depending on circumstance such as an installation position, a temperature, or an individual difference of the liquid lens. Therefore, it is necessary to adjust focus of the lens at appropriate timing. This focusing can be achieved in the method described in the second example embodiment described above. After the focus adjustment, the photographing device 20 scans focal positions in a predetermined range by using a liquid lens, and can thereby ensure that the iris is photographed in focus.

In the second example embodiment described above, the following modification is possible as an example. In step S21 in FIG. 15, the voltage value V may be set to an initial value V0 at a start of photographing, and may be set to a value reduced by a constant value ΔV from the immediately preceding value when the image is photographed repeatedly. In this case, in step S24, when the voltage value V becomes less than a predetermined threshold value, the photographing device 20 stops photographing.

The patterns used for the photographing is not limited to four types, and may be three types or five or more types of patterns. In addition, the distances (r1, r2, and r3) of the adjacent patterns with respect to the subject distance may all have different values, or at least any two of the distances may have the same value. Further, the voltage value ΔV used in the continuous photographing may be such that the in-focal position is changed by at least one of r1, r2, and r3 by changing ΔV by a factor of N (natural number). For example, when a voltage value at which the pattern P1 having the photographing distance r0 is in focus is V1 and a voltage value is set to V1+2ΔV, a state in which the pattern P2 having the photographing distance (r0+r1) is in focus can be established. By changing the voltage value in this way, it is possible to easily photograph an image in which the focal position is accurately adjusted for a plurality of patterns, and thus it is possible to acquire the correspondence relationship between the input signal and the focal position more accurately.

Third Example Embodiment

As illustrated in Math (2) described above, in a liquid lens, refractive power D and voltage value V have linear relationship. Therefore, when a liquid lens is used in a photographing device for object detection, biometric authentication, or the like, the photographing device changes the voltage value V by using parameters a and b set in advance, in such a way that the refractive power D becomes a value suitable for a position of a subject. However, due to a change in a photographing environment, the actual parameters a and b at a time of photographing frequently deviate from the parameters a and b set in advance.

For example, the parameters a and b vary depending on a change in ambient temperature, an individual difference, a misalignment when the liquid lens is mounted, and the like. "Misalignment when mounting a liquid lens" refers to a minute misalignment between a sensor surface and a lens position in, for example, an S-mount lens often used for a small camera or the like, that is caused due to the number of times of screwing when a lens incorporating the liquid lens is mounted with a screw. In addition to this, it is assumed that the parameters a and b change due to a change in the optical system caused by addition of the liquid lens.

Therefore, the photographing device needs to perform a calibration processing of re-acquiring the parameters a and b at an appropriate timing. In particular, in a camera system using a plurality of cameras, it is necessary to obtain parameters for a plurality of liquid lenses, and the calibration processing becomes more complicated.

The photographing device can re-acquire the accurate parameters a and b by performing, as the calibration processing, the processing described in the second example embodiment.

Fourth Example Embodiment

Figure 17:
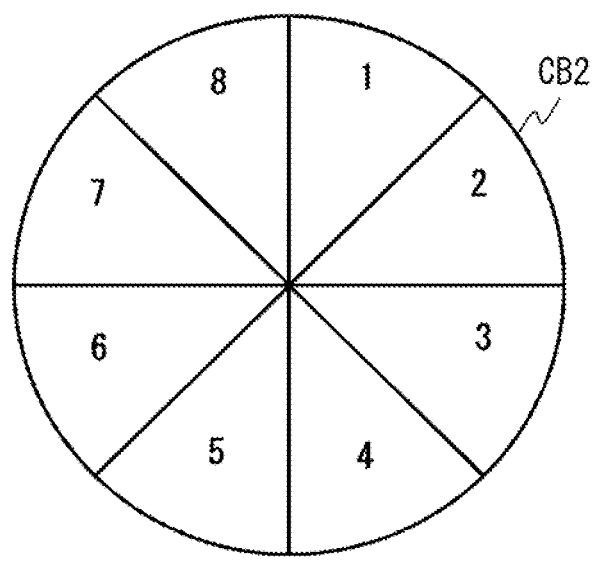
FIG. 17 is a front view showing a variant example of the calibration board according to the second example embodiment.

In the second example embodiment, the calibration board CB2 has a structure in which the stepped surfaces on which the patterns are formed are arranged in the horizontal direction. However, when the photographing device 20 photographs the calibration board CB2, there is a possibility that the image forming point of the lens of the image photographing unit 21 changes (aberration occurs) as a distance from the optical axis increases. Therefore, as illustrated in FIG. 17, which is a front view, the stepped surface of the calibration board CB2 may be formed in a circular shape when viewed from the photographing device 20. In top view, the calibration board CB2 has a spiral staircase-like shape with different depths. Further, a center of the circle of the calibration board CB2 is provided in such a way as to face the image photographing unit 21 substantially in front, and the stepped surface on which each pattern is formed is formed radially from the center of the circle of the calibration board CB2.

Figure 18:
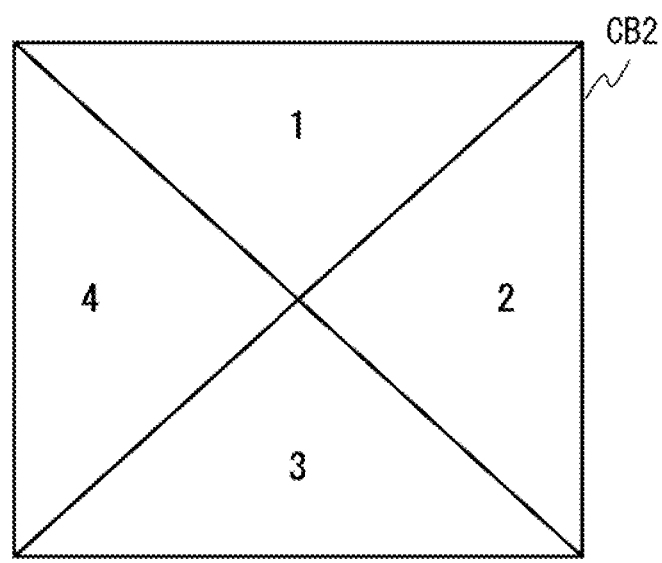
FIG. 18 is a front view showing a variant example of the calibration board according to the second example embodiment.
Figure 19:
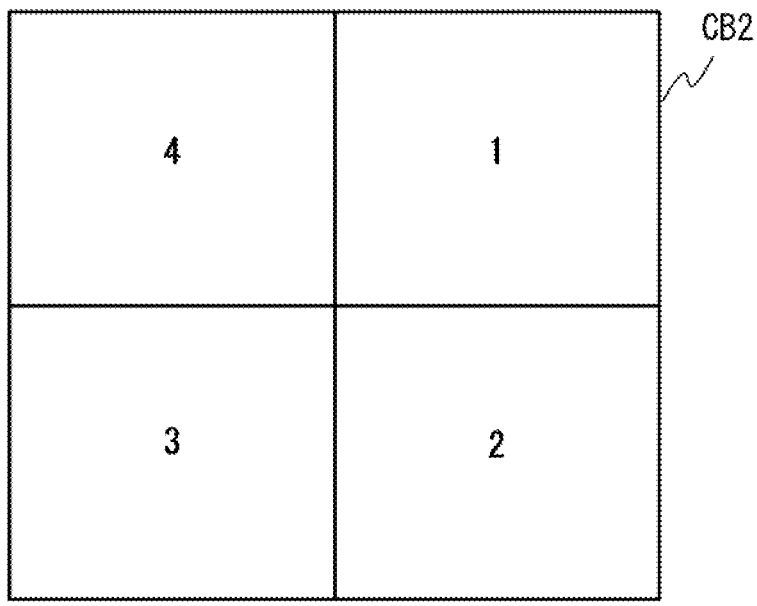
FIG. 19 is a front view showing a variant example of the calibration board according to the second example embodiment.

In addition, as illustrated in FIG. 18, which is a front view, the calibration board CB2 may be one in which a pattern region is divided by a line connecting a corner and a center of a quadrangle. Further, as illustrated in FIG. 19, which is a front view, the calibration board CB2 may be one in which a pattern region is divided by a line connecting a center of a quadrangle and a midpoint of a side. Note that, the calibration board CB2 may be any polygonal shape in front view instead of a quadrangle. In top view, these calibration boards CB2 have a spiral staircase-like shape with different depths. With such a board on which a depth of each pattern is slightly different from one another, calibration for different distances can be performed at one time (that is, a position of the board does not need to be changed at each time of calibration).

Fifth Example Embodiment

In the second example embodiment, the configuration has been described in which the photographing device 20 includes only one image photographing unit 21. However, a photographing device 20 may constitute a multi-camera system including a plurality of image photographing units 21. In this case, by setting angles of view of the plurality of image photographing units 21 in such a way as to hardly overlap each other, and disposing a calibration board having a plurality of different patterns within a range of the angle of view of each of the image photographing units 21, it is possible to photograph, at all the angles of view, different patterns whose depth positions are known. Calibration processing performed for each of the image photographing units 21 is the same as that described in detail in the second example embodiment, and thus the description thereof is omitted.

In addition, in the multi-camera system, as in the second example embodiment, it is also possible to capture the calibration board from each of the image photographing units 21 and estimate a parameter by using a focal position and an optimum voltage value related to a detected pattern.

The photographing device 20 may be applied to a multi-camera authentication system for a stationary subject or a multi-camera authentication system for a dynamic subject. The authentication system can photograph, by a plurality of photographing units, a living body such as an iris, a facial contour, a fingerprint, a vein, a handprint, or a walking motion. The plurality of photographing units may all be visible light photographing units, or may be provided with an infrared (for example, near infrared) photographing unit. When an infrared photographing unit is provided, patterns to be photographed can be detected as different patterns when infrared photographing is performed.

Sixth Example Embodiment

In the following example embodiments, timing at which calibration is performed by using a calibration board and broadcasting at a time the calibration will be further examined. In a sixth example embodiment, it is assumed that a photographing system 200 is provided as a walk-through iris authentication system at a gate of an airport or entrances of various buildings. The photographing device 20 detects an iris of a person walking toward the photographing device 20, and thereby determines whether the person is to be permitted to pass.

Herein, after the authentication system is installed, the photographing device 20 prompts, at a predetermined timing, an administrator of the authentication system to execute calibration processing of the photographing device 20. The predetermined timing is, for example, the following timing.

The photographing device 20 photographs a plurality of images of a person H, who is a photographing subject, in one trial of photographing, and calculates a focus evaluation value F of the photographed image. Specifically, an image photographing unit 21 photographs the plurality of images of the person H, and a recording unit 23 records the images. A pattern detection unit 24 acquires the plurality of images from the recording unit 23, and determines whether a pattern of an iris, which is a detection target, is included in the plurality of images. The pattern detection unit 24 outputs all images including the iris pattern to a focus evaluation unit 25. The focus evaluation unit 25 calculates a focus evaluation value for all iris patterns in the acquired images.

When at least one of the plurality of calculated focus evaluation values is equal to or larger than a reference value, the photographing device 20 determines that the calibration processing of the photographing device 20 is not necessary to be performed. However, in a case in which N times (N is any integer equal to or greater than 1) of trial occurs in which all of the plurality of calculated focus evaluation values do not satisfy the reference value, the photographing device 20 determines that a focal position thereof is not appropriate and it is necessary to perform the calibration processing of the photographing device 20. In this case, a control unit 22 controls each unit of the photographing device 20 and causes them to execute the calibration processing described in the second example embodiment.

Note that, also in a case in which, among the plurality of calculated focus evaluation values, the number of focus evaluation values that are equal to or larger than the reference value (for example, one or two) is equal to or less than the predetermined threshold value, and such a trial occurs N times, the photographing device 20 may similarly execute the calibration processing.

Further, when the above-described event occurs N times in succession, the photographing device 20 may determine that the calibration processing of the photographing device 20 is necessary to be performed. Alternatively, when the above-described event occurs N times in total since a start of use of the photographing device or since an end of a previous calibration processing, it may be determined that the calibration processing of the photographing device 20 is necessary to be performed.

Further, the photographing device 20 may perform the following processing on an assumption that the person H, who is a photographing subject, is only in a depth range of a specific range. The photographing device 20 photographs a plurality of images of the person H in one trial of photographing, and determines whether focus evaluation values F of the photographed images are in a normal distribution (an arch-shaped distribution) in time series. As described above, since the person H walks toward the photographing device 20, when a focal position of the image photographing unit 21 is within a range in which the person H is assumed to be, the person H passes through the focal position of the image photographing unit 21 while walking. In this case, it is inferred that the focus evaluation value F of the plurality of images takes a maximum value when the person H is at or near the focal position, and the focus evaluation value F decreases according to the normal distribution as time becomes earlier or later from the maximum value.

Therefore, when the focus evaluation values F of the photographed images are normally distributed in time series, the photographing device 20 determines that it is not necessary to perform the calibration processing of the photographing device 20. However, in a case in which the focus evaluation values F are not normally distributed in time series, the photographing device 20 determines that the focal position is not appropriate and it is necessary to perform the calibration processing of the photographing device 20. In this case, the control unit 22 controls each unit of the photographing device 20 and causes them to execute the calibration processing described in the second example embodiment.

Seventh Example Embodiment

Figure 20:
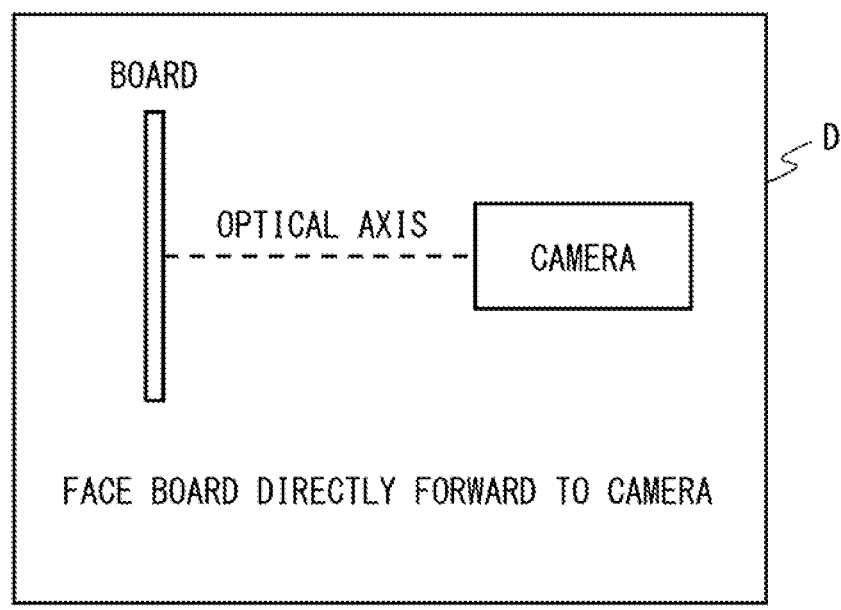
FIG. 20 is a diagram illustrating a display of a photographing device according to a second example embodiment.

When performing calibration, a photographing device 20 can broadcast a user that execution of photographing is announced in advance in order that an appropriate pattern for the calibration is captured. For example, when it is determined that calibration processing of the photographing device 20 needs to be performed, the photographing device 20 may perform display illustrated in FIG. 20 on a display unit (broadcast unit) of the photographing device 20. On a display unit D in FIG. 20, a layout diagram of a board at a time of the calibration is displayed, and the layout is such that a board surface provided with the pattern used for calibration is perpendicular to an optical axis of a camera. In addition, a text message "Face the board directly forward to the camera." is also displayed on the display unit D. By these displays, it is possible to instruct the user in such a way that the pattern is captured from the front of the photographing device 20 and thereby the pattern can be detected more accurately.

The display on the display unit may be only either one of a figure and a text message. Also, an audio instruction using a speaker and the like may be used alone or in combination with at least either one of a figure and a text message.

Eighth Example Embodiment

Further, after performing photographing, a photographing device 20 may detect orientation of at least one board (pattern) from a photographed image when the pattern on the board is detected, and determine whether the board faces directly forward to the photographing device 20. When it is determined that the board faces directly forward to the photographing device 20 (in particular, an image photographing unit 21), the photographing device 20 performs the calibration processing described in detail in the second example embodiment. When the board does not directly face forward to the photographing device 20 but faces the photographing unit 20 obliquely, the photographing device 20 can output an instruction such as "Face the board directly forward". Further, in a case where the photographing device 20 can detect, from the photographed image, a degree of inclination of the board with respect to the photographing device 20, the photographing device 20 may output a specific instruction for causing the board to face directly forward, such as "Tilt the board slightly to the right", based on the degree of inclination of the board. These instructions are output by using at least one of a voice, a figure, and a text message. The orientation of the board (pattern) to be detected is not limited to one, and may be more than one. In addition, a known image detection technique can be used for detecting the degree of inclination of the board.

Ninth Example Embodiment

Figure 21:
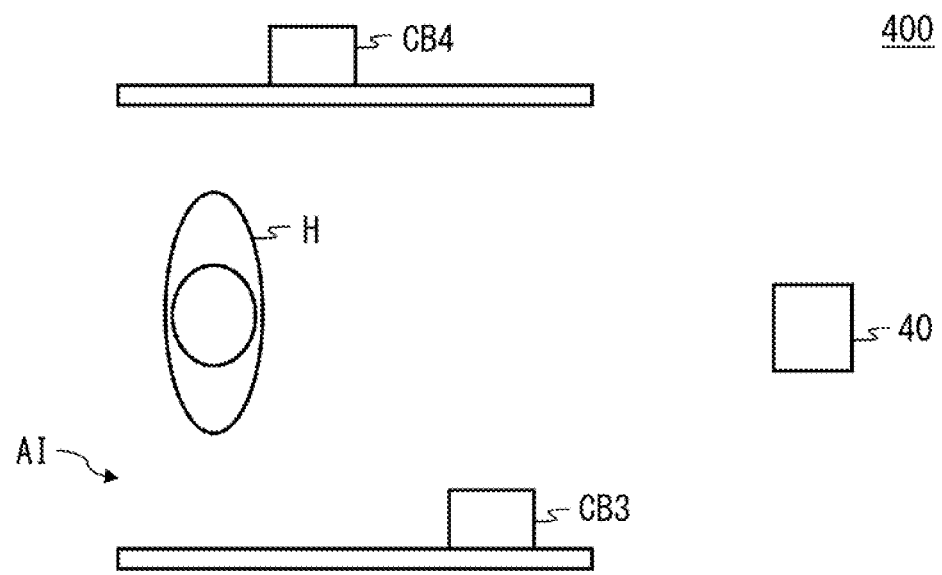
FIG. 21 is a top view of a walk-through iris authentication system according to a third example embodiment.
Figure 22:
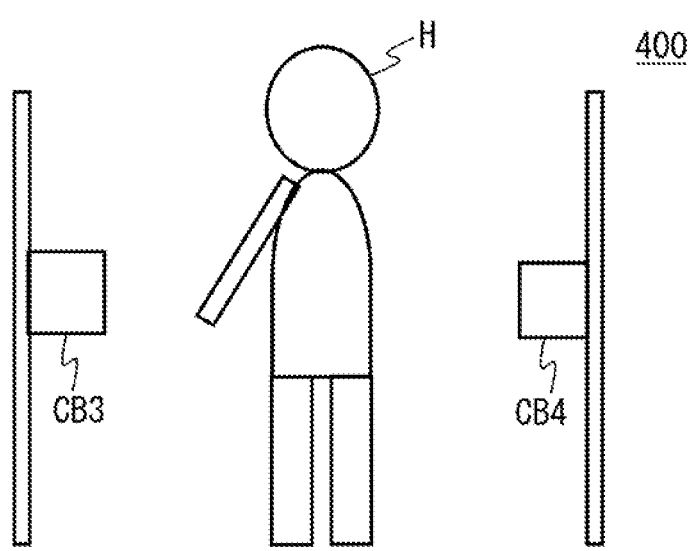
FIG. 22 is a side view of the walk-through iris authentication system according to the third example embodiment.

In addition, a photographing device may photograph an image of a pattern provided on a calibration board every time photographing of an iris of a person H is completed, and thereby perform the calibration processing described in detail in the second example embodiment. For example, a walk-through iris authentication system 400 will be described below as a system that performs such calibration processing. FIG. 21 is a top view of the walk-through iris authentication system 400, and FIG. 22 is a side view of the person H, a calibration board CB3, and a calibration board CB4 of the walk-through iris authentication system 400 as viewed from a photographing device 40. The photographing device 40 of the walk-through iris authentication system 400 detects the iris of the person H walking through a passage AI and thereby determines whether the person H is a permitted subject. The photographing device 40 includes the same components as the photographing device 20 described in the second example embodiment.

Calibration boards CB3 and CB4 having different subject distances from the photographing device 40 and being provided with patterns different from each other are arranged on both sides of the passage AI. The photographing device 40 captures an image of the patterns provided on the calibration boards CB3 and CB4 after one trial of photographing processing of the person H is completed, and performs the calibration processing described in detail in the second example embodiment. In this way, in the walk-through iris authentication system 400, the calibration board is arranged in a position in which an image of the calibration board can always be captured by the photographing device 40, and thereby the calibration processing can be performed without an administrator preparing the calibration board.

Tenth Example Embodiment

In the example embodiments 6 to 9, the photographing device determines necessity of calibration, and thus performs the calibration processing. However, a photographing device may store a pattern on a board as a specific pattern in a storage unit, and automatically start the above-described calibration processing when detecting that the photographing device has photographed the specific pattern.

Specifically, in a photographing system 200, when an image photographing unit 21 of a photographing device 20 performs normal photographing (in a state in which the calibration processing is not performed), a pattern detection unit 24 acquires the photographed image from a recording unit 23, and determines whether two or more types of specific patterns are included in the image. When two or more types of specific patterns are not included in the image, the photographing device 20 does not execute the calibration processing.

If two or more types of specific patterns are included in the image, the photographing device 20 can execute the calibration processing described in the first or second example embodiment. Therefore, the control unit 22 controls each unit of the device, to photograph each of a first specific pattern and a second specific pattern at different focal positions a plurality of times, thereby executing the above-described calibration processing. By this processing, when an administrator of the photographing device prepares the calibration board, the photographing device can immediately perform the calibration processing, and thus time required for the calibration processing can be reduced.

Eleventh Example Embodiment

In the example embodiments 6 to 10, a case has been described in which the photographing device automatically determines whether the calibration processing is to be performed. However, after a photographing device is put into operation or is shipped to the factory before a start of use, calibration processing of the photographing device may be periodically performed based on a judgment made by a person.

In the above-described example embodiments, this disclosure has been described as a hardware configuration, but this disclosure is not limited thereto. This disclosure can also be achieved by performing the processing described in the above example embodiments (specifically, the calibration processing illustrated in the flowcharts of FIGS. 4, 15, and 16) by causing a processor to execute a computer program.

Figure 23:
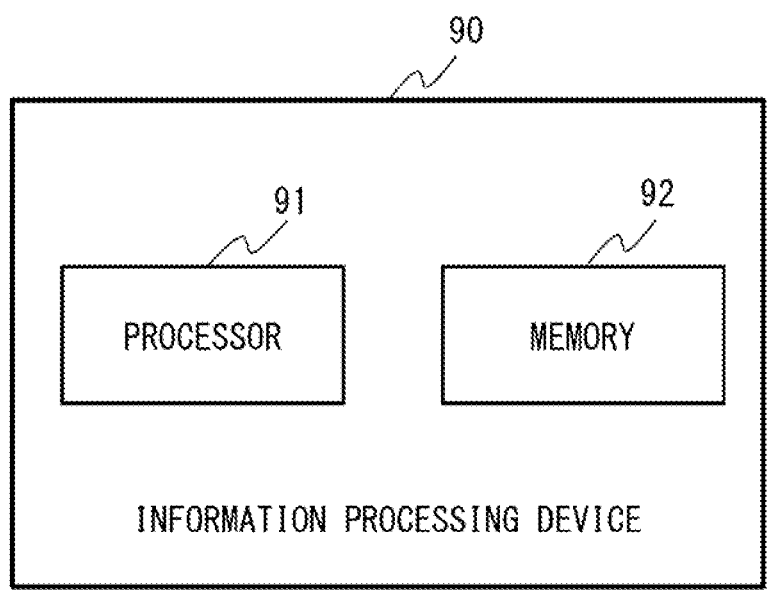
FIG. 23 is a block diagram illustrating an example of a hardware configuration of a photographing device.

FIG. 23 is a block diagram illustrating an example of a hardware configuration of a computer on which the processing of the photographing device according to each of the above-described example embodiments is executed. Referring to FIG. 23, an information processing device 90 includes a processor 91 and a memory 92.

The processor 91 reads software (a computer program) from the memory 92 and executes the software, and thereby performs the processing of the device described in the above-described example embodiments. As the processor 91, one of a central processing unit (CPU), a graphics processing unit (GPU), a field-programmable gate array (FPGA), a demand-side platform (DSP), and an application specific integrated circuit (ASIC) may be used, or a plurality of processors may be used in parallel.

The memory 92 is configured of a combination of a volatile memory and a non-volatile memory. The memory 92 may include a storage located remotely from the processor 91. In this case, the processor 91 may access the memory 92 via an unillustrated input/output (I/O) interface.

In the example in FIG. 23, the memory 92 is used for storing a software module group. The processor 91 reads the software module group from the memory 92 and execute software modules, and can thereby perform the processing described in the above-described example embodiments.

As described above, the one or more processors included in the photographing device in the above-described example embodiment execute one or more programs including an instruction group for causing a computer to execute an algorithm described with reference to the drawings. By this processing, the processing described in each of the example embodiments can be achieved.

The programs can be stored and provided to the computer using various types of non-transitory computer readable media. The non-transitory computer-readable medium includes various types of tangible storage media. Examples of the non-transitory computer-readable medium include a magnetic recording medium (e.g., a flexible disk, a magnetic tape, a hard disk drive), a magneto-optical recording medium (e.g., a magneto-optical disk), a read only memory (CD-ROM), a CD-R, a CD-R/W, and a semi-conductor memory (e.g., a mask ROM, a programmable ROM (PROM), an erasable PROM (EPROM), a flash ROM, and a random access memory (RAM)). The program may also be provided to the computer by various types of transitory computer readable media.

Examples of the transitory computer-readable medium include an electrical signal, an optical signal, and an electromagnetic wave. The transitory computer readable medium can provide the program to the computer via a wired communication path such as an electric wire, an optical fiber, and the like, or a wireless communication path.

Some or all of the above-described example embodiments may be described as the following supplementary notes, but are not limited thereto.

(Supplementary Note 1)

A photographing system comprising:
photographing means for photographing each of a first pattern and a second pattern provided at a subject distance different from a subject distance of the first pattern a plurality of times at a focal position different for each time;
control means for setting, for the photographing means, a control value for changing the focal position:
evaluation means for evaluating degrees of focus of a plurality of images of the first pattern photographed by the photographing means and selecting an image having a maximum evaluation value, as well as evaluating degrees of focus of a plurality of images of the second pattern photographed by the photographing means and selecting an image having a maximum evaluation value: and
acquisition means for acquiring a correspondence relationship between a focal position of an optical system and a control value, based on the control values used in capturing the image of the first pattern and the image of the second pattern being selected by the evaluation means, and subject distances of the first pattern and the second pattern.

(Supplementary Note 2)

The photographing system according to Supplementary Note 1, wherein the first pattern and the second pattern are different patterns.

(Supplementary Note 3)

The photographing system according to Supplementary Note 1 or 2, wherein
the photographing means includes a liquid lens, and
the control means sets, as the control signal, a voltage for changing a curvature of the liquid lens.

(Supplementary Note 4)

The photographing system according to any one of Supplementary Notes 1 to 3, wherein
the photographing means photographs a photographing subject a plurality of times,
the evaluation means evaluates degrees of focus of a plurality of images of the photographing subject photographed by the photographing means, and
the control means controls the photographing means in such a way as to photograph each of the first pattern and the second pattern a plurality of times at a focal position different for each time, based on evaluation values of the degrees of focus of a plurality of images of the photographing subject, as calibration processing, controls the evaluation means in such a way as to select an image having the maximum evaluation value among a plurality of images of the first pattern and to select an image having the maximum evaluation value among a plurality of images of the second pattern, and controls the acquisition means in such a way as to acquire a correspondence relationship between a focal position of an optical system and a control value, based on the control values used in capturing the image of the first pattern and the image of the second pattern being selected by the evaluation means, and subject distances of the first pattern and the second pattern.

(Supplementary Note 5)

The photographing system according to Supplementary Note 4, wherein the control means controls the photographing means, the evaluation means, and the acquisition means in such a way as to execute the calibration processing when evaluation values of degrees of focus of the plurality of images are all equal to or less than a predetermined threshold value.

(Supplementary Note 6)

The photographing system according to Supplementary Note 4 or 5, wherein the control means controls the photographing means, the evaluation means, and the acquisition means in such a way as to execute the calibration processing when evaluation values of degrees of focus of the plurality of images are not normally distributed in time series.

(Supplementary Note 7)

The photographing system according to any one of claims 1 to 6, wherein, when it is detected that the photographing means photographs the first pattern and the second pattern, the control means causes the photographing means to photograph each of the first pattern and the second pattern a plurality of times at a focal position different for each time, and thereby controls the acquisition means in such a way as to acquire the correspondence relationship.

(Supplementary Note 8)

The photographing system according to any one of Supplementary Notes 1 to 7, wherein the photographing device comprises broadcast means for broadcasting, before the photographing means is caused to photograph each of the first pattern and the second pattern a plurality of times at a focal position different for each time, that photographing is announced in advance.

(Supplementary Note 9)

The photographing system according to any one of Supplementary Notes 1 to 8, wherein the photographing device comprises broadcast means for, when the photographing means photographs each of the first pattern and the second pattern, broadcasting that orientation of the first pattern and the second pattern with respect to the photographing means should be changed, based on each photographed image.

(Supplementary Note 10)

The photographing system according to any one of Supplementary Notes 1 to 9, wherein the photographing device includes a plurality of the photographing means, and the control means controls the plurality of the photographing means in such a way as to photograph each of the first pattern and the second pattern a plurality of times at a focal position different for each time, controls the evaluation means in such a way, regarding the plurality of the photographing means, as to select an image having the maximum evaluation value among a plurality of images of the first pattern and to select an image having the maximum evaluation value among a plurality of images of the second pattern, and controls the acquisition means in such a way as to acquire a correspondence relationship between a focal position of an optical system and a control value, for the plurality of the photographing means, based on the control values used in capturing the image of the first pattern and the image of the second pattern being selected by the evaluation means, and subject distances of the first pattern and the second pattern.

(Supplementary Note 11)

The photographing system according to any one of Supplementary Notes 1 to 10, wherein the system further includes a calibration apparatus including the first pattern and the second pattern, and the first pattern and the second pattern of the calibration apparatus are separated from the photographing means by subject distances different from each other.

(Supplementary Note 12)

The photographing system according to any one of Supplementary Notes 1 to 11, wherein the first pattern is provided on a first board, and the second pattern is provided on a second board arranged in such a way as to be stepped from the first board.

(Supplementary Note 13)

A calibration method comprising:

a step of photographing, by photographing means, each of a first pattern and a second pattern provided at a subject distance different from a subject distance of the first pattern a plurality of times at a focal position different for each time:

a step of setting a control value for causing the photographing means to change the focal position:

a step of evaluating degrees of focus of a plurality of images of the first pattern photographed by the photographing means and selecting an image having a maximum evaluation value, as well as evaluating degrees of focus of a plurality of images of the second pattern photographed by the photographing means and selecting an image having a maximum evaluation value: and a step of acquiring a correspondence relationship between a focal position of an optical system and a control value, based on the control values used in capturing the selected image of the first pattern and the selected image of the second pattern, and subject distances of the first pattern and the second pattern.

(Supplementary Note 14)

A non-transitory computer-readable medium storing a calibration program that causes a computer to execute:

a step of photographing, by photographing means, each of a first pattern and a second pattern provided at a subject distance different from a subject distance of the first pattern a plurality of times at a focal position different for each time:

a step of setting a control value for causing the photographing means to change the focal position:

a step of evaluating degrees of focus of a plurality of images of the first pattern photographed by the photographing means and selecting an image having a maximum evaluation value, as well as evaluating degrees of focus of a plurality of images of the second pattern photographed by the photographing means and selecting an image having a maximum evaluation value: and a step of acquiring a correspondence relationship between a focal position of an optical system and a control value, based on the control values used in capturing the selected image of the first pattern and the selected image of the second pattern, and subject distances of the first pattern and the second pattern.

Although this disclosure has been described with reference to the example embodiments, this disclosure is not limited thereto. Various modifications that can be understood by those skilled in the art within the scope of the disclosure can be made to the configuration and details of this disclosure.

REFERENCE SIGNS LIST

10 PHOTOGRAPHING DEVICE
11 PHOTOGRAPHING UNIT
12 CONTROL UNIT
13 EVALUATION UNIT
14 ACQUISITION UNIT
20 PHOTOGRAPHING DEVICE
21 IMAGE PHOTOGRAPHING UNIT
22 CONTROL UNIT
23 RECORDING UNIT
24 PATTERN DETECTION UNIT
25 FOCUS EVALUATION UNIT
26 FOCUSED IMAGE EXTRACTION UNIT
27 PARAMETER ESTIMATION UNIT
100 PHOTOGRAPHING SYSTEM
200 PHOTOGRAPHING SYSTEM
CB1 CALIBRATION APPARATUS
CB2 CALIBRATION BOARD

What is claimed is:

1. A photographing system comprising:

a hardware photographing device configured to photograph each of a first pattern and a second pattern provided at a subject distance different from a subject distance of the first pattern a plurality of times at a focal position different for each time;

at least one memory storing instructions; and at least one processor configured to execute the instructions to:

set, for the hardware photographing device, a control value for changing the focal position;

evaluate degrees of focus of a plurality of images of the first pattern photographed by the hardware photographing device and select an image having a maximum evaluation value, as well as evaluate degrees of focus of a plurality of images of the second pattern photographed by the hardware photographing device and select an image having a maximum evaluation value; and acquire a correspondence relationship between a focal position of an optical system and a control value, based on the control values used in capturing the image of the first pattern and the image of the second pattern being selected, and subject distances of the first pattern and the second pattern.

2. The photographing system according to claim 1, wherein the first pattern and the second pattern are different patterns.

3. The photographing system according to claim 1, wherein
the hardware photographing device includes a liquid lens, and
the at least one processor is further configured to set, as the control value, a voltage for changing a curvature of the liquid lens.

4. The photographing system according to claim 1, wherein, when it is detected that the hardware photographing device photographs the first pattern and the second pattern, the at least one processor is further configured to cause the hardware photographing device to photograph each of the first pattern and the second pattern a plurality of times at a focal position different for each time to acquire the correspondence relationship.

5. The photographing system according to claim 1, wherein the at least one processor is further configured to: broadcast, before the hardware photographing device is caused to photograph each of the first pattern and the second pattern a plurality of times at a focal position different for each time, that photographing is to be performed.

6. The photographing system according to claim 1, wherein, when the hardware photographing device photographs each of the first pattern and the second pattern, the at least one processor is further configured to broadcast that orientation of the first pattern and the second pattern with respect to the hardware photographing device should be changed, based on each photographed image.

7. The photographing system according to claim 1, further comprising a hardware calibration apparatus having the first pattern and the second pattern,
wherein the first pattern and the second pattern of the calibration apparatus are separated from the hardware photographing device by a subject distance different for each of the patterns.

8. A calibration method performed by a computer comprising:
photographing, by a hardware photographing device, each of a first pattern and a second pattern provided at a subject distance different from a subject distance of the first pattern a plurality of times at a focal position different for each time;
setting a control value for causing the hardware photographing device to change the focal position;
evaluating degrees of focus of a plurality of images of the first pattern photographed by the hardware photographing device and selecting an image having a maximum evaluation value, as well as evaluating degrees of focus of a plurality of images of the second pattern photographed by the hardware photographing device and selecting an image having a maximum evaluation value; and
acquiring a correspondence relationship between a focal position of an optical system and a control value, based on the control values used in capturing the selected image of the first pattern and the selected image of the second pattern, and subject distances of the first pattern and the second pattern.

9. A non-transitory computer-readable medium storing a program that causes a computer to execute:
photographing, by a hardware photographing device, each of a first pattern and a second pattern provided at a subject distance different from a subject distance of the first pattern a plurality of times at a focal position different for each time;
setting a control value for causing the hardware photographing device to change the focal position;
evaluating degrees of focus of a plurality of images of the first pattern photographed by the hardware photographing device and selecting an image having a maximum evaluation value, as well as evaluating degrees of focus of a plurality of images of the second pattern photographed by the hardware photographing device and selecting an image having a maximum evaluation value; and
acquiring a correspondence relationship between a focal position of an optical system and a control value, based on the control values used in capturing the selected image of the first pattern and the selected image of the second pattern, and subject distances of the first pattern and the second pattern.

\* \* \* \* \*